United States Patent
Dellinger et al.

(10) Patent No.: US 7,549,427 B2
(45) Date of Patent: Jun. 23, 2009

(54) NANOLAYER CATALYSTS USEFUL IN PROMOTING OXIDATION, AND THEIR MANUFACTURE AND USE

(75) Inventors: Harold B. Dellinger, Baton Rouge, LA (US); Slawomir M. Lomnicki, Prairieville, LA (US)

(73) Assignee: Board of Supervisors of Louisiana State University and Agricultural and Mechanical College, Baton Rouge, LA (US)

(*) Notice: Subject to any disclaimer, the term of this patent is extended or adjusted under 35 U.S.C. 154(b) by 729 days.

(21) Appl. No.: 11/180,290

(22) Filed: Jul. 13, 2005

(65) Prior Publication Data

US 2008/0023016 A1 Jan. 31, 2008

Related U.S. Application Data

(60) Provisional application No. 60/589,239, filed on Jul. 20, 2004.

(51) Int. Cl.
*B01J 20/02* (2006.01)
*A24B 1/00* (2006.01)
*A24D 3/06* (2006.01)
*B01J 23/00* (2006.01)

(52) U.S. Cl. .............. 131/342; 502/328; 502/338; 502/406; 588/320; 131/360

(58) Field of Classification Search .......... 502/328, 502/338, 340, 350, 439, 406; 588/320; 131/342, 131/360
See application file for complete search history.

(56) References Cited

U.S. PATENT DOCUMENTS 6,689,714 B2 * 2/2004 Wheelock et al. ........... 502/400
7,341,977 B2 * 3/2008 Klabunde et al. ........... 502/400

2002/0187347 A1 * 12/2002 Halas et al. .................. 428/403

(Continued)

FOREIGN PATENT DOCUMENTS

WO   WO 03020058 A1   3/2003

(Continued)

OTHER PUBLICATIONS

Li, P. et al., "The removal of carbon monoxide by iron oxide nanoparticles," Appl. Catal. B: Environ., vol. 43, pp. 151-162 (2003).

(Continued)

*Primary Examiner*—Cam N. Nguyen
(74) *Attorney, Agent, or Firm*—John H. Runnels; Bonnie J. Davis

(57) ABSTRACT

A novel nanocatalyst is disclosed containing titanium oxide, iron oxide, and calcium oxide. The catalyst comprises a layer of iron oxide in the gamma form supported on a titanium oxide core. Addition of calcium cations helps to stabilize the iron oxide in the gamma form. The iron oxide layer is on the order of a few nanometers thick on the surface of the titanium oxide core, in an "egg-in-shell" structure. The nanocatalyst is highly active in promoting the oxidation of compounds such as hydroquinone, catechol, other hydrocarbons, chlorinated phenols, and carbon monoxide, even at moderately elevated temperatures. The catalyst remains active in a pyrolytic environment for extended periods of time, and possesses high redox cycling potential. The efficiency of the catalyst is not strongly affected by coking in a combustion environment. The catalyst may be used, for example, to reduce levels of radicals, catechols, dioxins, other toxic hydrocarbons, and carbon monoxide in cigarette smoke, incinerator waste streams, and waste streams from other, combustion sources. The catalyst operates efficiently at temperatures typical of tobacco smoke, is formed from nontoxic materials, and is relatively inexpensive. Methods of making and using the catalyst are also disclosed.

22 Claims, 4 Drawing Sheets

U.S. PATENT DOCUMENTS

2003/0151029 A1* 8/2003 Hsu et al. .................. 252/500
2004/0250828 A1 12/2004 Luan et al.
2006/0132896 A1* 6/2006 Hsu et al. .................. 359/296

FOREIGN PATENT DOCUMENTS

WO     WO 03086112 A1    10/2003
WO     WO 03086115 A1    10/2003

OTHER PUBLICATIONS

Lomnicki, S. et al., "Development of a supported iron oxide catalyst for destruction of PCDD/F," Abstracts, A&WMA 96th Annual Conference, pp. 13-14 (2003).

Lomnicki, S. et al., "Development of a supported iron oxide catalyst for destruction of PCDD/F," Environ. Sci. Technol., vol. 37, pp. 4254-4260 (2003).

Muto, H. et al., "Potential Health Risk via Inhalation/Ingestion Exposure to Polychlorinated Dibenzo-p-dioxins and Dibenzofurans," Bull. Environ. Contam. Toxicol., vol. 49, pp. 701-707 (1992).

* cited by examiner

NANOLAYER CATALYSTS USEFUL IN PROMOTING OXIDATION, AND THEIR MANUFACTURE AND USE

The benefit of the Jul. 20, 2004 filing date of provisional application Ser. No. 60/589,239 is claimed under 35 U.S.C. § 119(e).

The development of this invention was funded in part by the Government under grant number R827719-01-0 awarded by the Environmental Protection Agency. The Government has certain rights in this invention.

This invention pertains to redox catalysts, particularly to catalysts that are useful in oxidizing toxins in cigarette smoke and other heated gaseous mixtures.

Although it may be impossible to make cigarettes and other tobacco products truly "safe," it is nevertheless a highly desirable goal to reduce the level of toxins contained in tobacco smoke. While smokers may become habituated to nicotine, meaning that it could be self-defeating to try to remove nicotine from cigarette smoke entirely, there could still be substantial public health benefits from removing other toxins from the stream of cigarette smoke, such as carbon monoxide, certain hydrocarbons, and free radicals. Lower toxin levels could benefit not only smokers, but also those who are exposed to secondhand smoke. There is an unfilled need for a catalyst that will: (1) promote the oxidation of carbon monoxide to carbon dioxide, (2) promote the decomposition of toxic compounds found in tobacco smoke, preferably while simultaneously oxidizing CO, (3) reduced the concentrations of free radicals and their precursors, (4) operate efficiently over a temperature range from about 180° C. to about 900° C., which includes temperatures typical of the generation of cigarette smoke, (5) operate efficiently in a coking or fouling environment, (6) comprise nontoxic materials, and (7) be relatively inexpensive.

There have been prior reports of iron-oxide based catalysts for detoxifying cigarette smoke, but these catalysts generally lose activity rapidly as tar from the smoke clogs pores on the catalyst surface.

P. Li et al., "The removal of carbon monoxide by iron oxide nanoparticles," *Appl. Catal. B: Environ.*, vol. 43, pp. 151-162 (2003) discloses that $Fe_2O_3$ nanoparticles (3 nm) were more effective than larger $Fe_2O_3$ particles in oxidizing carbon monoxide.

Published international patent application WO 03/086112 discloses the use of an oxyliydride such as FeOOH, AlOOH, or TiOOH in cigarettes, where the oxyhydride decomposes to form a product that acts as an oxidant or catalyst for the conversion of carbon monoxide to carbon dioxide.

Published international patent application WO 03/020058 discloses the use of nanoparticle additives in cigarettes as an oxidant or catalyst for the conversion of carbon monoxide to carbon dioxide. The nanoparticles are selected from $Fe_2O_3$, CuO, $TiO_2$, $CeO_2$, $Ce_2O_3$, $Al_2C_3$, $Y_2O_3$ doped with zirconium, and $Mn_2O_3$ doped with palladium.

Published international patent application WO 03/086115 discloses the use of partially reduced nanoparticle additives in cigarettes as an oxidant for the conversion of carbon monoxide to carbon dioxide, or the conversion of nitric oxide to nitrogen. The compound that is partially reduced may be selected from $Fe_2O_3$, CuO, $TiO_2$, $CeO_2$, $Ce_2O_3$, $Al_2O_3$, $Y_2O_3$ doped with zirconium, and $Mn_2O_3$ doped with palladium. Preferably, the partially reduced additive comprised $Fe_2O_3$ nanoparticles that had been treated with a reducing gas such as CO, $H_2$, or $CH_4$.

Published international patent application WO 03/086112 discloses the use of ferric oxide or zinc oxide in a tobacco product to cause the preferential combination of nitrogen with hydrogen rather than with oxygen and carbon, to form ammonia rather than pyridines, for example.

S. Lomnicki et al., "Development of a supported iron oxide catalyst for destruction of PCDD/F," Abstracts, A&WMA 96th Annual Conference, pp. 13-14 (2003) reported supported iron oxide catalysts for PCDD/F decomposition using 2-monochlorophenol as a surrogate test compound. Iron oxide catalysts supported on titania were prepared by two methods: impregnation and the sol-gel method. The sol-gel preparation method was reported to result in better dispersion of iron oxide on the surface and the formation of ã-Fe2O3. This was reported to be in contrast to the impregnated samples, where á-Fe2O3 crystallites were formed. Formation of ã-Fe2O3 was said to result in improved reducibility of the active phase that favorably affected the catalytic oxidation properties of the catalyst, i.e. the light-off curves for the sol-gel samples were shifted towards lower temperature. Addition of calcium oxide to iron oxide catalyst was said to further improve the performance of the system through stabilization and increase in the concentration of ã-Fe2O3 in the sol-gel prepared samples. Calcium oxide was also said to improve the chlorine transfer from the surface iron oxide species thereby providing a relatively fresh surface for further catalytic oxidation.

We have discovered a nanocatalyst containing titanium oxide, iron oxide, and calcium oxide. The novel nanocatalyst is highly active in promoting the oxidation of various compounds, including for example hydroquinone, substituted hydroquinones, catechol, substituted catechols, other hydrocarbons, chlorinated phenols, free radicals, and carbon monoxide, even at moderately elevated temperatures. We have also discovered methods of making and using the novel catalyst. The catalyst remains active in both pyrolytic and oxygen-rich environments for extended periods of time, and possesses high redox cycling potential. Unlike prior, high porosity catalysts whose pores are susceptible to clogging by coke, the efficiency of the novel catalyst is not strongly affected by coking in a combustion environment. The novel catalyst may be used, for example, to reduce levels of radicals, catechols, dioxins, other toxic hydrocarbons, and carbon monoxide in tobacco smoke, incinerator waste streams, and waste streams from other combustion sources. The novel catalyst operates efficiently over a temperature range from about 180° C. to about 900° C., which includes temperatures typical of tobacco smoke, is formed from nontoxic materials, and is relatively inexpensive. When used to reduce levels of undesired compounds in tobacco smoke, the catalyst may be present as an admixture with tobacco, or it may be incorporated into a filter (e.g., a cigarette filter), or both.

The catalyst comprises a layer of iron oxide, at least some of which is in the gamma form, supported on a titanium oxide core. Preferably at least 10% of the iron oxide is in the gamma form. The iron oxide layer has a thickness on the order of a few nanometers on the surface of the titanium oxide core, in an "egg-in-shell" structure. The limited addition of calcium cations helps to stabilize the iron oxide in the gamma form.

The catalyst comprises about 85-97% titanium oxide by weight, primarily in the core; about 1-15% by weight iron oxide, preferably about 3-10% by weight, contained primarily in a shell surrounding the titanium oxide core; calcium about 0.5-10 mole-% of the iron, preferably about 1-5 mole-% of the iron, primarily in the shell; and about 0-5% by weight other components which, if present, are in sufficiently low concentration that they do not substantially reduce the activity of the catalyst as compared to an otherwise-identical catalyst lacking such other components. The titania core preferably has a diameter between about 50 nm and about 100 µm, more preferably between about 100 nm and about 50 µm.

This catalyst may be prepared, for example, by a sol-gel preparation method.

The novel catalyst is capable of low-temperature redox cycling between the +2 and +3 oxidation states of iron, starting at temperatures as low as ~180° C. The catalyst promotes the low-temperature (i.e., below about 500° C.) or moderate temperature (i.e., up to about 900° C.) oxidation of carbon monoxide to carbon dioxide, and also promotes the low-temperature or moderate-temperature oxidation of organic compounds, including for example phenols, hydrocarbons, and chlorinated hydrocarbons. Preliminary experiments have confirmed the low-temperature efficacy of the novel catalyst in promoting the oxidation of carbon monoxide, hydroquinone and its derivatives, and catechol and its derivatives, all of which may be found as toxins in cigarette smoke.

The novel catalyst will catalyze the oxidation and decomposition of a variety of compounds, such as toxic components of various combustion streams, including a variety of unsubstituted and substituted hydrocarbons, including for example acrolein, formaldehyde, acetone, benzene, substituted benzenes, halogenated benzenes, phenol, substituted phenols, halogenated phenols, other hydroxylated aromatic hydrocarbons, hydroxylated polycyclic aromatic hydrocarbons, catechol, substituted catechols, a quinone, a hydroquinone, substituted hydroquinones, chloroform, bromoform, furan, substituted furans, dioxane, substituted dioxanes, volatile organic compounds, halogenated volatile organic compounds, dibenzo-p-dioxin, substituted dibenzo-p-dioxins, halogenated dibenzo-p-dioxins, dibenzofuran, substituted dibenzofurans, halogenated dibenzofurans, lignin, lignin decomposition products, ketones, substituted ketones, aldehydes, substituted aldehydes, radicals derived from any of these compounds, and other organic gas-phase radicals.

The novel catalyst is inexpensive to manufacture, it is highly efficient, and it does not readily lose activity by coking. Thus, for example, it maintains a high degree of activity in a stream such as cigarette smoke. The novel catalyst will catalyze the destruction of free radicals and their precursors in a stream such as cigarette smoke, and also inhibit the formation of the radicals upon exposure to air. Such radicals may include, for example, para-semiquinone, ortho-semiquinone, substituted semiquinones, phenoxyl, substituted phenoxyls, and other oxygen-containing radicals.

To the inventors' knowledge, there are no prior reports of catalysts containing each of the following three components: titanium oxide, iron oxide, and calcium oxide—whether prepared in the manner of this invention or otherwise.

Standard iron oxide catalysts typically comprise the α-iron oxide crystal structure. The α-crystalline structure of iron oxide is quite stable; but it requires high temperatures to become an efficient catalyst. By contrast, the γ form of iron oxide is far more reactive; but it is thermodynamically unstable, and it readily converts to the more stable α form, especially when heated. The alpha form of $Fe_2O_3$ has an octahedral structure, while the gamma form is a mixture of tetrahedral and octahedral structures, with unbalanced valences that contribute to its reactivity. Without wishing to be bound by this theory, we believe that our preparative approach forces a substantial fraction of the iron oxide into the more reactive γ form, and stabilizes it sufficiently to maintain it without converting to the α form upon heating. Without wishing to be bound by this theory, we believe that in the novel catalyst the calcium ions assist, at least in part, by filling vacancies in the gamma-form crystal structure of $Fe_2O_3$, vacancies that would otherwise allow the active gamma-form to convert to the less reactive alpha-form. Adding calcium ions fills some, but not all, of the unbalanced vacancies in the γ crystal structure, thereby stressing bonds and maintaining catalytic activity. Excessive amounts of calcium, however, are undesirable, as excess calcium can fill too many of the vacancies. It is believed that the titanium oxide also plays a role in stabilizing the iron oxide in the gamma form.

Nanoparticle catalysts achieve high surface area without the need for pores, and they are therefore less susceptible to deactivation by clogging or coking. It may be more accurate, however, to describe the novel catalyst not as being based upon nanoparticles per se, but rather as comprising microparticles with nanolayer coatings, an "egg-in-shell" structure. The novel catalysts are resistant to pore clogging by coke formation. Unlike many prior catalysts, it is believed that the novel catalysts do not require pores to achieve high activity. However, it is possible that if a highly porous surface were used, then the pores could clog under conditions conducive to coking, thereby reducing activity. It is therefore preferred that the catalyst particles should not be highly porous. High dispersion of the nanometer-scale active phase of the catalyst is achieved without the need for a strongly porous system, through the use of an "egg-in-shell" structure; i.e., a relatively nonporous titanium oxide core (diameter on the order of micrometers) is coated with a thin layer of active iron oxide catalyst (thickness on the order of nanometers).

Catalysts in accordance with the present invention may optionally be supported on a solid substrate, for example on a honeycomb-type structure, or in or on a fiber.

The iron and calcium sources used in the preparation may be chosen from a variety of precursors, both organometallic and inorganic. The precursors should be soluble in the preparation solvent. Otherwise, most organometallic sources of calcium or iron are suitable, as are inorganic sources that, upon decomposition (e.g., oxidation), do not leave substantial amounts of the counter-anion in the structure of the nanoparticle. (For example, chlorides and sulfonates would generally be undesirable, as they would have a tendency to leave residues of chlorine or sulfur, respectively, in the crystal structure.) Titanium isopropoxide is the preferred titanium precursor.

A preferred method for preparing uses the following sequential steps:

(a) mixing a substantially anhydrous solution of titanium isopropoxide with a substantially anhydrous solution of an iron (III) salt and a substantially anhydrous solution of a calcium salt;

(b) adding to the mixture a sufficient amount of water and acid to initiate hydrolysis and gelation;

(c) allowing sufficient time for the mixture to gel;

(d) removing the solvent with heat under reduced pressure to make a sol; and (e) calcining the sol in the presence of oxygen; whereby oxides are formed having catalytic properties.

EXAMPLE 1

Preparation of Catalyst

In experiments to date, our best results have been obtained when either iron (III) nitrate, or iron (III) acetylacetonate was used as the active phase precursor.

The active phase precursor was dissolved in absolute ethanol in a 1:100 molar ratio at room temperature, in the absence of substantial amounts of water. Next, calcium acetylacetonate was dissolved in the solution. (The amount of calcium is chosen to achieve the desired concentration of calcium in the final product.) A few drops of water and hydrochloric acid were added to make the solution slightly acidic (e.g., pH around 6.0-6.9).

A titanium isopropoxide solution was prepared in absolute ethanol in a 1:150 molar ratio at room temperature.

The two solutions were then mixed, and the mixture was left standing at room temperature for gelation (about 2 weeks). After gelation and subsequent drying at room temperature for 3 days, the samples were dried at 80° C. under vacuum for 24 hours. The dried samples were then calcined in air at 400° C. for 4 hours. The samples were ground to obtain the desired mesh size, and separated into size fractions. Preferred size is 100-120 mesh, but the size can vary depending on the particular use to which the catalyst will be put.

Scanning electron micrographs (not shown) confirmed that a thin layer (~3.5 nm) of iron oxide had formed on the exterior of the titanium oxide core. More generally, this layer may be between about 1 nm and about 20 nm.

EXAMPLES 2-5

Oxidation of 2-Monochlorophenol

Figure 1:
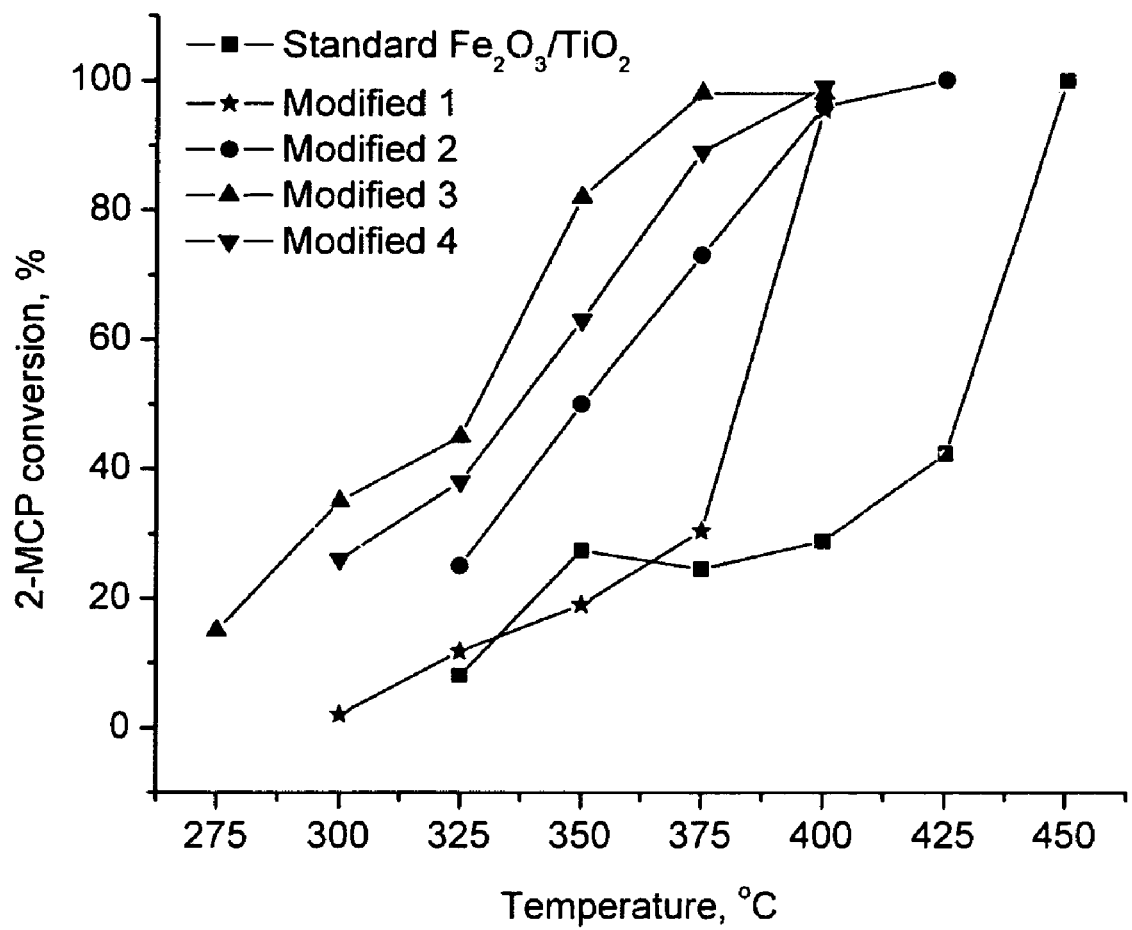
FIG. 1 depicts the percentage conversion of 2-monochlorophenol over four embodiments of the novel nanocatalyst, and over a standard $Fe_2O_3/TiO_2$ catalyst.
Figure 2:
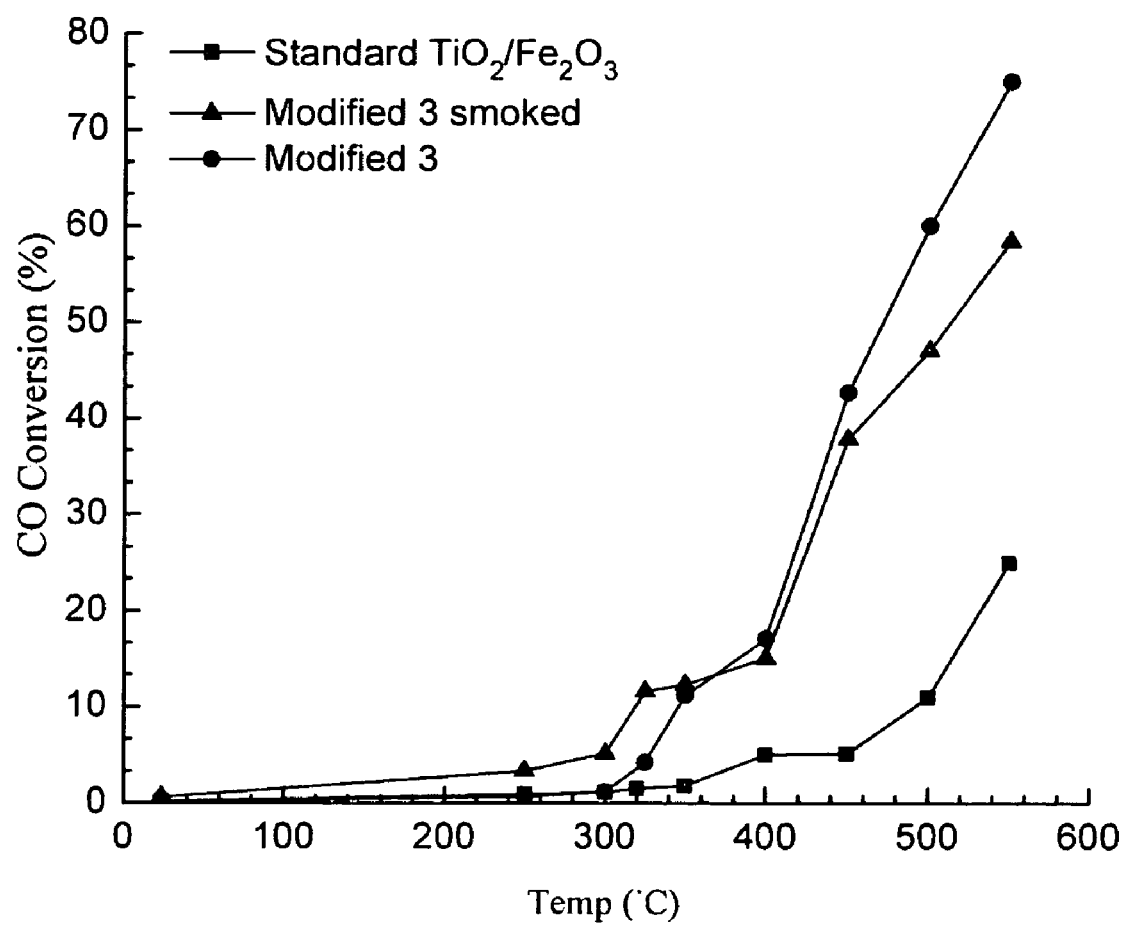
FIG. 2 depicts the percentage conversion of carbon monoxide over embodiments of the novel nanocatalyst, both with and without pre-exposure of the catalyst to cigarette smoke.

FIG. 1 depicts a comparison of the degradation of a chlorinated hydrocarbon, namely 2-monochlorophenol, over unmodified iron oxide particles, versus degradation over four embodiments of the novel catalyst. These catalytic oxidation experiments were conducted over a packed bed, one-pass, gravitational quartz reactor (¼ inch=0.64 cm inner diameter). Onto a quartz wool bed were placed 30 mg of catalyst mixed with 30 mg of quartz powder. The reactor was positioned in a high-temperature furnace, maintained at constant temperature in the range 275-450° C. Prior to running an experiment, each catalyst sample was activated in 20% $O_2$/He (20 mL/min) for 1 hour at 450° C. 2-monochlorophenol (2-MCP) was introduced into the gas stream by bubbling a 20% $O_2$/He stream through a saturator that was maintained at room temperature and filled with liquid 2-MCP. The catalytic reactor was connected in-line with an HP5890 Series II gas-chromatograph equipped with a flame ionization detector. Reaction products and bypass reagent were sampled with a six-port valve equipped with a 2 mL stainless steel loop. The products were separated from one another with a Chrompack CP-Sil 8 CB capillary column (30 m long, 0.32 mm inner diameter).

Control tests of the empty reactor without catalyst, and of the reactor containing the quartz wool bed and quartz powder but without catalyst, showed no significant destruction of 2-MCP over the studied temperature range.

Four different catalyst compositions were tested. The "standard" 5% $Fe_2O_3$/$TiO_2$ composition (i.e., a more conventional catalyst) was prepared by impregnating $TiO_2$ with an aqueous solution of iron (III) nitrate. Modified catalysts 1-4 were sol-gel samples prepared as described above. These four catalysts had the following compositions:

| | |
|---|---|
| Modified catalyst 1: | 5% $Fe_2O_3$/Titania |
| Modified catalyst 2: | 5% $Fe_2O_3$/Titania + 1% Ca |
| Modified catalyst 3: | 5% $Fe_2O_3$/Titania + 3% Ca |
| Modified catalyst 4: | 5% $Fe_2O_3$/Titania + 5% Ca |

The novel catalysts had substantially improved properties, with the high conversion regime shifted about 100-150° C. lower than with the conventional catalyst.

EXAMPLES 6 AND 7

Oxidation of Carbon Monoxide

In this experiment we compared the oxidation of carbon monoxide as a function of temperature over Modified Catalyst 3 (as described above.) The reaction feed comprised 0.75% CO mixed with air (i.e., ~20% $O_2$). Total gas flow was 100 $cm^3$ per minute over 30 mg catalyst.

These catalytic oxidation experiments were conducted over a packed bed, one-pass, gravitational quartz reactor (¼ inch=0.64 cm inner diameter). Onto a quartz wool bed were placed 30 mg of catalyst mixed with 30 mg of quartz powder. The reactor was positioned in a high-temperature furnace, maintained at constant temperature in the range 50-600° C. Prior to running an experiment, each catalyst sample was activated in 20% $O_2$/He (20 mL/min) for 1 hour at 450° C. For samples that are denoted as "smoked," the smoke from one whole commercial Marlboro cigarette, whose filter had previously been cut off, was pulled in "puff mode" through the catalyst bed, which was maintained at 200° C. The temperature was then set to the desired value, and a mixture of 0.75% CO and 20% $O_2$ (by weight) in He was pulled through the catalyst bed at a total flow rate of 100 mL/min. The gasses exiting the catalyst bed (particularly CO) were analyzed on a MIDAC 2000 FTIR spectrometer in real time.

Control tests of the empty reactor without catalyst, and of the reactor containing the quartz wool bed and quartz powder but without catalyst, showed no significant destruction of CO over the studied temperature range.

The novel catalyst was superior to the conventional iron oxide catalyst for CO oxidation. We also found that the catalyst retained most of its activity for CO oxidation following exposure to cigarette smoke. The activity of the catalyst remained high despite its contact with the coke and tar from cigarette smoke.

Similar results are expected when the experiment is repeated for oxidation of CO (and other compounds) directly in a stream of cigarette smoke or other tobacco smoke.

EXAMPLES 8 AND 9

Oxidation of Catechol and Hydroquinone

Figure 3A:
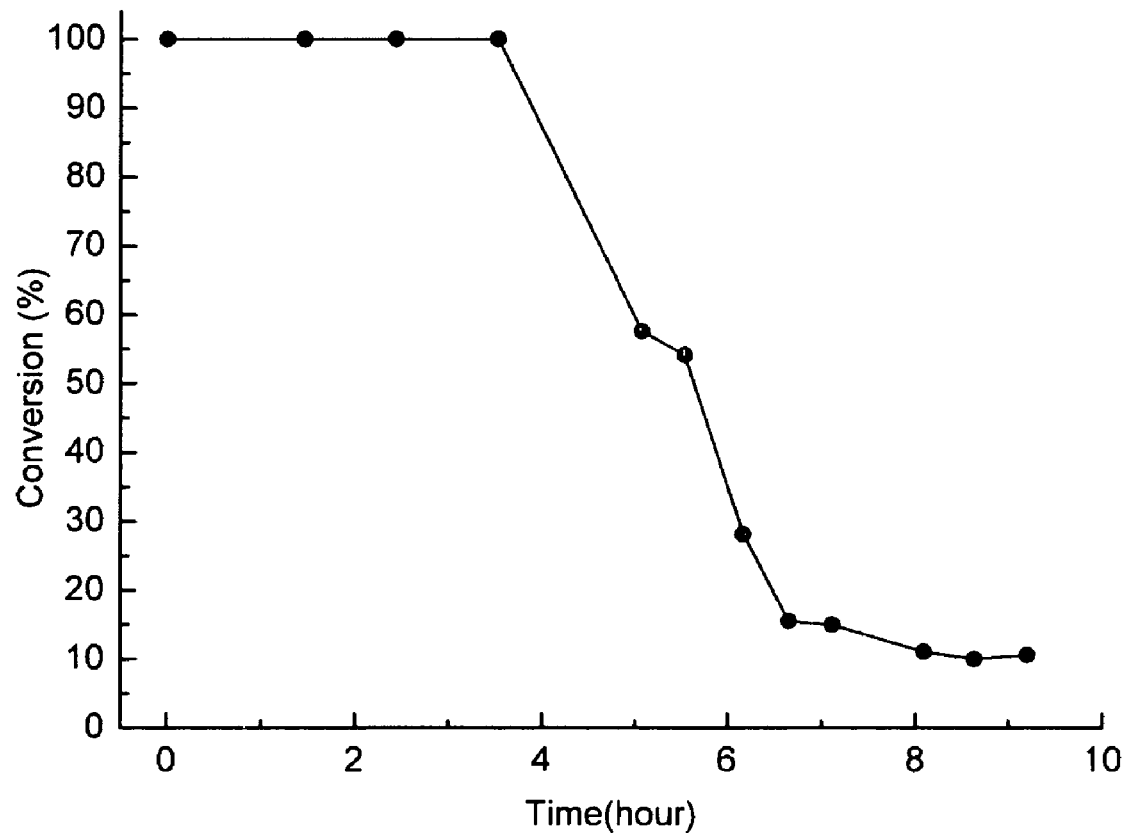
FIGS. 3(A) and 3(B) depict the oxidation of catechol and hydroquinone over embodiments of the novel nanocatalyst.

We have also tested the activity of the novel iron oxide catalyst in promoting the oxidation of two known radical precursors in cigarette smoke, namely catechol and hydroquinone. The results of these experiments are shown in FIGS. 3(A) and (B), respectively. The catalytic oxidation experiments were conducted over a packed bed, one-pass, gravitational quartz reactor (¼ inch=0.64 cm inner diameter). Onto a quartz wool bed were placed 30 mg of catalyst mixed with 30 mg of quartz powder. The reactor was positioned in a high-temperature furnace, maintained at constant temperature of 120° C. Prior to running an experiment, each catalyst sample was activated in 20% $O_2$/He (20 mL/min) for 1 hour at 450° C. Either catechol or hydroquinone was introduced into the gas stream using a Varian Chromatoprobe at an injection port held at 90° C. for catechol or 120° C. for hydroquinone, at a rate to maintain a constant 20 ppm concentration of the reactant in the input stream. The outlet of the heated injection port connected directly to the reactor. Helium (with no oxygen) was used as the carrier gas for both reagents at a flow rate of 100 mL/min. The catalytic reactor was connected in-line with an HP5890 Series II gas chromatograph equipped with a flame ionization detector. Reaction products and by-pass reagent were sampled with a six-port valve equipped with a 2 mL stainless steel loop. The products were separated from one another with a Chrompack CP-Sil 8 CB capillary column (30 m long, 0.32 mm inner diameter).

Control tests of the empty reactor without catalyst, and of the reactor containing the quartz wool bed and quartz powder but without catalyst, showed no significant destruction of either catechol or hydroquinone over the studied temperature range.

Figure 3B:
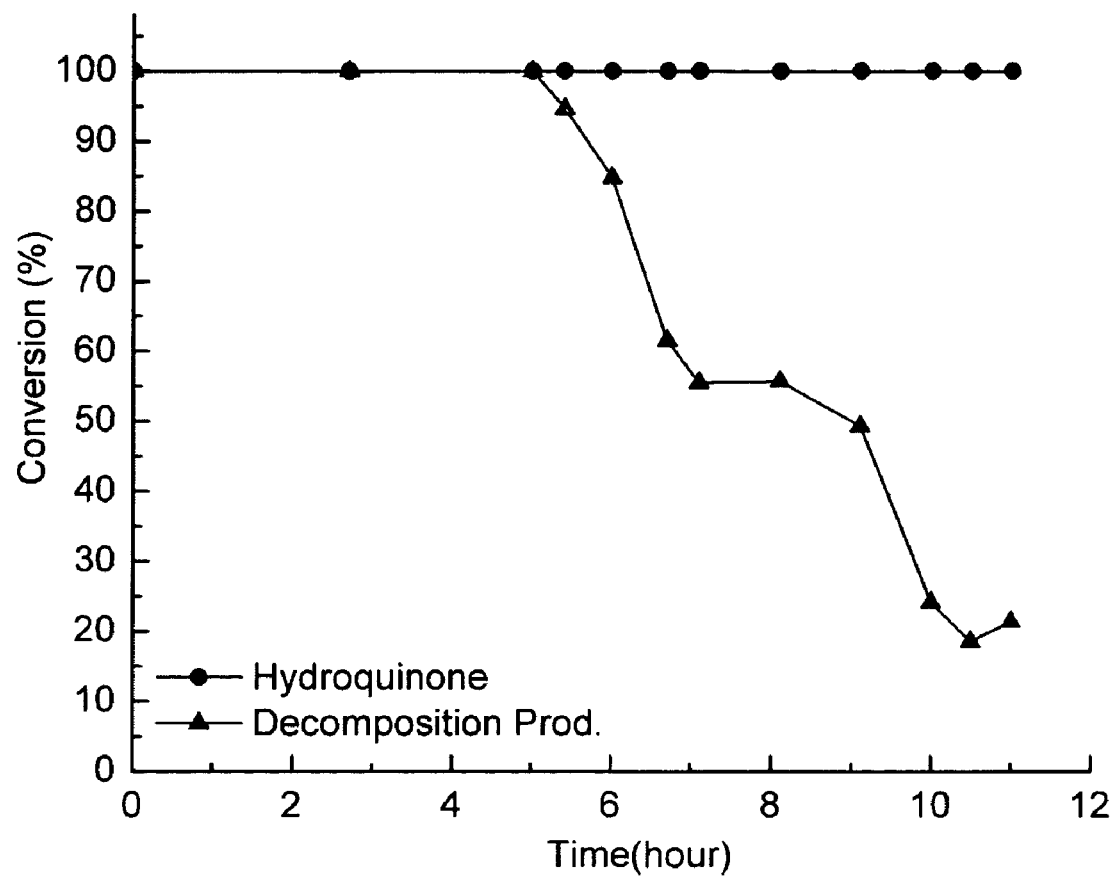

In both cases, 20 ppm of catechol or 20 ppm of hydroquinone, as appropriate, were passed over 30 mg of the novel catalyst, under pyrolytic conditions. Both cathecol and hydroquinone readily decomposed over the novel catalyst at the relatively low temperature of 120° C. FIG. 3B depicts the total conversion of hydroquinone to $CO_2$, as well as the appearance of organic decomposition products after 5 hours of reaction. (These organic decomposition products were not further analyzed.) High efficiency was maintained for several hours, after which the conversion rate started to decline. It appears that there was sufficient structural oxygen in the active phase (i.e., in the nanoparticles, rather than in the gas phase) to sustain complete oxidation of both cathecol and hydroquinone for about 4 hours. No other organic products were detected during the first 4 hours of either reaction, suggesting efficient oxidation to $CO_2$.

EXAMPLE 10

Removal of Semiquinone Radicals from Cigarette Smoke

We have also tested the activity of the novel iron oxide catalyst to removing semiquinone radicals from cigarette smoke. Marlboro™ Red cigarettes were purchased from a local retail outlet. The filter of each cigarette was removed, and replaced with 30 mg of modified catalyst 4, placed between two quartz wool stoppers. Downstream of the catalyst an acetate filter was placed to remove particulate matter from the smoke stream. As a control, otherwise identical experimental cigarettes were prepared, but without the catalyst. The cigarettes were lit, and experimental "puffs" of 180 mL each were pulled through each cigarette. Thus each "puff" corresponded to approximately two "real puffs" by ordinary human smokers, and each cigarette was consumed after 4 such experimental puffs. The acetate filter was replaced after each puff, and each of the acetate filters with deposited total particulate matter (TPM) was left in air for 96 hours and then analyzed for semiquinone radical content. The total EPR radical signal per gram of total particulate matter decreased by 58%, from $168 \times 10^6$ for the control cigarettes to $72 \times 10^6$ spins per gram of TPM for the cigarettes with the incorporated catalyst. As shown in the table below, radical removal was greatest in the middle of the cigarette (puffs 2 and 3), although not inconsiderable at the beginning of the cigarette (puff 1), and still significant at the end (puff 4).

TABLE 1

| | Semiquinone radical destruction | | | |
|---|---|---|---|---|
| | Puff 1 | Puff 2 | Puff 3 | Puff 4 |
| EPR radical signal intensity per gram total particulate matter, control | $85.46 \times 10^6$ | $49 \times 10^6$ | $10 \times 10^6$ | $23.77 \times 10^6$ |
| EPR radical signal intensity per gram total particulate matter, catalyst | $43.56 \times 10^6$ | $7.37 \times 10^6$ | $1.55 \times 10^6$ | $19.60 \times 10^6$ |
| Percent reduction | 49% | 85% | 85% | 18% |

Definitions. As used in the specification and claims, the "diameter" of an object refers to the longest distance between any two points that both lie on the surface of the object. Thus the use of the term "diameter" should not be construed as implying that an object is necessarily spherical, nor that it necessarily has a circular cross-section.

The "thickness" of a layer refers to the mean thickness of the layer, averaged over the entire layer. Thus the use of the term "thickness" should not be construed as implying that a layer necessarily has a uniform thickness.

Miscellaneous. The complete disclosures of all references cited in this specification are hereby incorporated by reference. Also incorporated by reference is the entire disclosure of the following publication by the inventors, a publication that is not prior art to the present application: S. Lomnicki et al., "Development of a supported iron oxide catalyst for destruction of PCDD/F," *Environ. Sci. Technol.*, vol. 37, pp. 4254-4260 (2003). In the event of an otherwise irreconcilable conflict, however, the present specification shall control.

What is claimed:

1. A particle comprising a core and a shell, wherein:
   (a) said shell adheres to said core;
   (b) said core comprises titanium oxide, and the diameter of said core is between about 50 nm and about 100 μm;
   (c) said shell comprises iron oxide and calcium oxide, and the thickness of said shell is between about 1 nm and about 20 nm;
   (d) the fraction of iron oxide in the particle is between about 1% and about 15% by weight; and the ratio of calcium to iron is between about 0.5 mole-% and about 10 mole-%.

2. A particle as recited in claim 1, wherein: said core consists essentially of titanium oxide, the diameter of said core is between about 100 nm and about 50 μm, and said shell consists essentially of iron oxide and calcium oxide.

3. A particle as recited in claim 1, wherein at least some of the iron oxide has a gamma-form crystal structure.

4. A particle as recited in claim 1, wherein at least about 10% of the iron oxide has a gamma-form crystal structure.

5. A composition comprising a plurality of particles as recited in claim 1.

6. Tobacco admixed with a composition as recited in claim 5.

7. A cigarette comprising tobacco as recited in claim 6.

8. A filter cigarette comprising tobacco and a filter, wherein said filter comprises a composition as recited in claim 5.

9. A method for catalytically oxidizing or catalytically destroying at least one compound selected from the group consisting of carbon monoxide, acrolein, formaldehyde, acetone, benzene, halogenated benzenes, phenol, halogenated phenols, hydroxylated polycyclic aromatic hydrocarbons, catechol, substituted catechols, hydroquinone, substituted hydroquinones, chloroform, bromoform, furan, substituted furans, dioxane, substituted dioxanes, dibenzo-p-dioxin, halogenated dibenzo-p-dioxins, dibenzofuran, halogenated dibenzofurans, lignin, lignin decomposition products, ketones, substituted ketones, substituted aldehydes, and radicals derived from any of the above compounds; said method comprising reacting the compound with oxygen at a temperature between about 120° C. and about 900° C. in the presence of a composition as recited in claim 5; wherein the compound is oxidized at a rate that is substantially greater than the rate at which the same compound would be oxidized under conditions that are otherwise identical, except that the composition of claim 5 is absent.

10. A method as recited in claim 9, wherein both carbon monoxide, and at least one further compound as recited, in addition to carbon monoxide, are catalytically oxidized or catalytically destroyed simultaneously.

11. A method as recited in claim 9, wherein the composition is admixed with tobacco prior to combustion of the tobacco, wherein the compound is a component of smoke produced by combustion of the tobacco, and wherein a temperature sufficient for the catalytic oxidation is produced by the combustion of the tobacco.

12. A method as recited in claim 11, wherein the tobacco is a component of a cigarette.

13. A method as recited in claim 9, wherein the composition of claim 5 is contained in a filter for a cigarette, wherein the compound is a component of smoke produced by combustion of tobacco, wherein a temperature sufficient for the catalytic oxidation is produced by the combustion of the tobacco, and wherein the catalytic oxidation occurs as cigarette smoke passes through the filter.

14. A method as recited in claim 9, wherein the compound is carbon monoxide.

15. A method as recited in claim 9, wherein the compound is a catechol.

16. A method as recited in claim 9, wherein the compound is a quinone or a hydroquinone.

17. A method as recited in claim 9, wherein the compound is phenol or a halogenated phenol.

18. A method as recited in claim 9, wherein the compound is a chlorinated hydrocarbon.

19. A method as recited in claim 9, wherein the compound is benzene, dibenzo-p-dioxin, a halogenated dibenzo-p-dioxin, dibenzofuran, a halogenated dibenzofuran, or a halogenated benzene.

20. A method as recited in claim 9, wherein the compound is a semiquinone radical, a substituted semiquinone radical, a phenoxyl radical, a substituted phenoxyl radical, an oxy-polycyclic aromatic hydrocarbon radical, or a substituted oxy-polycyclic aromatic hydrocarbon radical.

21. A method for catalytically oxidizing or catalytically destroying at least one compound selected from the group consisting of substituted benzenes, substituted phenols, hydroxylated aromatic hydrocarbons, substituted dibenzo-p-dioxins, substituted dibenzofurans, aldehydes, halogenated volatile organic compounds, unsubstituted hydrocarbons, substituted hydrocarbons, radicals derived from any of the above compounds, and organic gas-phase radicals; said method comprising reacting the compound with oxygen at a temperature between about 120° C. and about 900° C. in the presence of a composition as recited in claim 5; wherein the compound is oxidized at a rate that is substantially greater than the rate at which the same compound would be oxidized under conditions that are otherwise identical, except that the composition of claim 5 is absent.

22. A composition comprising a solid support and a plurality of particles as recited in claim 1, wherein said particles adhere to said support.

* * * * *